Feb. 11, 1969 L. E. SEGESMAN 3,426,381
HOUSING AND AIR-WATER SEPARATOR ASSEMBLY FOR
FLOOR TREATING MACHINES
Filed Nov. 15, 1966

United States Patent Office 3,426,381
Patented Feb. 11, 1969

3,426,381
HOUSING AND AIR-WATER SEPARATOR ASSEMBLY FOR FLOOR TREATING MACHINES
Louis E. Segesman, North Canton, Ohio, assignor to The Hoover Company, Canton, Ohio, a corporation of Delaware
Filed Nov. 15, 1966, Ser. No. 594,551
U.S. Cl. 15—353                                7 Claims
Int. Cl. A47l 9/10, 9/20

ABSTRACT OF THE DISCLOSURE

A housing and air-water separator for floor treating machines having a main dished housing member divided by a bulkhead into a rear compartment receiving an air conduit extending from a nozzle to a separator positioned in the upper portion of the structure and a forward dished section. The rear wall of the separator is formed by the bulkhead. A projecting element on the bulkhead extends into the separator and cooperates with a transversely extending flange to provide an anti-flood block to block dirty water out of the separator as the handle is dropped or lowered to the floor.

---

The present invention relates to a housing and air-water separator assembly for a floor treating machine. The machine is of the type which is selectively useable to scrub floors or to pick water up through a suction nozzle. In such a device it is important that the elements are compactly assembled. Such a device includes a housing for mounting a liquid container and for providing a built-in air-water separator. Such features must be very compactly and economically assembled for a successful device.

According to this invention a housing assembly is provided by using a main dished housing member and dividing it with a bulkhead. The bulkhead forms a compartment in the bottom of the dished housing through which an air conduit extends from a nozzle to a separator. The separator is formed integrally in the top of the housing and the bulkhead serves as part of the separator. The bulkhead has an integral offset portion in the air-water separator to serve as an anti-flood block to keep dirty water from flowing back into the separator if the handle is dropped. The housing itself also forms part of the handle for the device and the bulkhead provides a front recess in the dished housing to receive a liquid container. Prior devices of this type have been expensive and very cumbersome, and did not have the advantageous arrangements previously pointed out.

Therefore, it is an object of this invention to provide a scrubbing and liquid pick-up device with a housing assembly which has a built-in air-water separator, a closed conduit compartment and a mounting space for a liquid container.

It is a further object of this invention to provide an anti-flood arrangement in the air-water separator as an integral part of a dividing bulkhead.

It is another object of this invention to utilize the housing assembly as part of the handle for the machine. Other objects and advantages will be apparent to those skilled in the art as the description proceeds when taken in connection with the accompanying drawing wherein.

Figure 1:
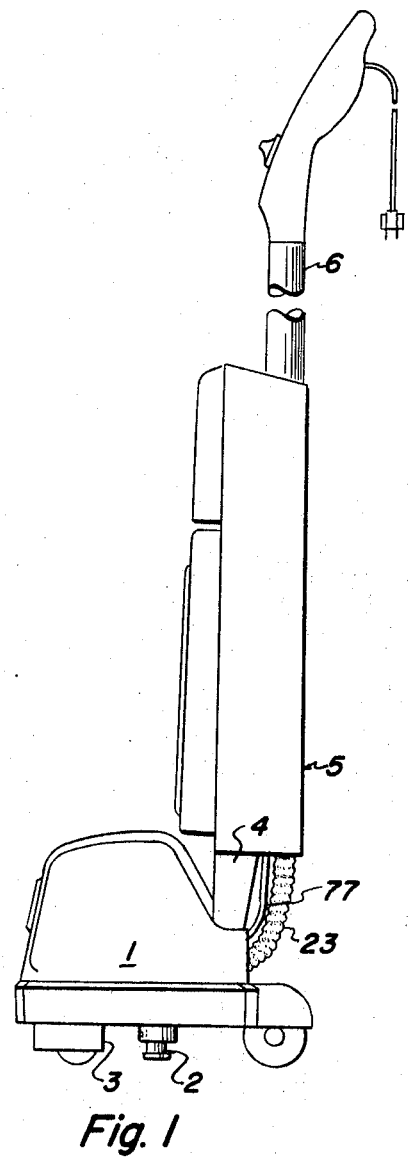
FIGURE 1 is a side view of an appliance having the present invention embodied therein.

FIGURE 1 shows a floor scrubbing and wet pickup device including a main body portion 1 having thereon power driven brush mounting shaft 2 and suction nozzle 3. Attached to main body portion is a bail bracket 4, the attachment being made in a manner well known to those being skilled in the floor polisher art. Mounted on bail bracket 4 is a housing 5 and attached at the top of housing 5 is a handgrip portion 6 of the handle. Bail bracket 4, housing 5 and handgrip portion 6 form the handle of the device.

Figure 2:
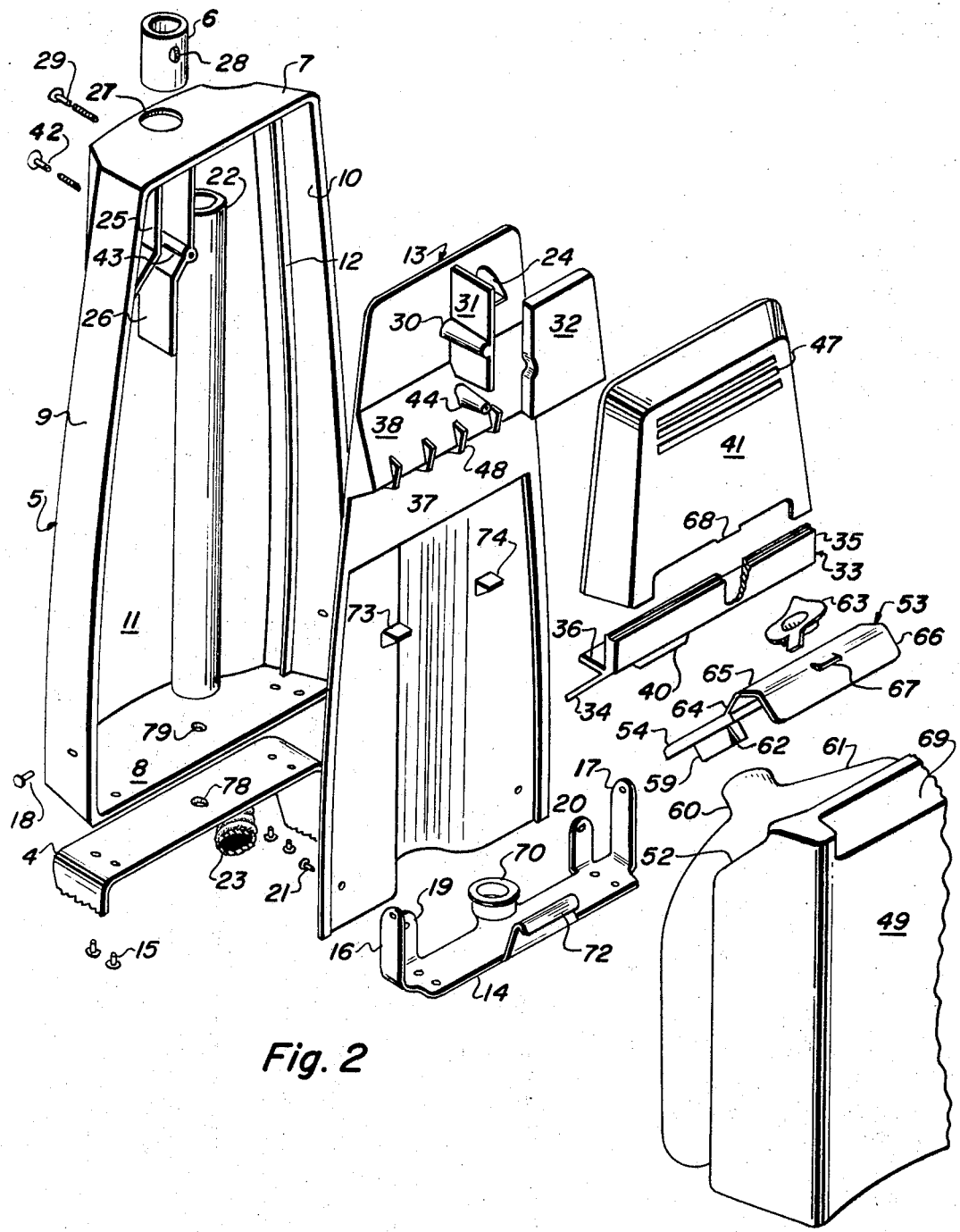
FIGURE 2 is an exploded isometric view showing the parts of the housing assembly of the present invention.

Referring now to FIGURE 2 housing 5 is shown as a one-piece plastic molding and has top wall 7, bottom wall 8, side walls 9 and 10, and back wall 11. Substantially midway of back wall 11 and the outer edges of top wall 7, and side walls 9 and 10 housing 5 has formed integrally therewith an inwardly extending flange 12. A bulkhead member 13 fits within housing 5 and the back periphery of the top and side edges of bulkhead 13 are adhesively secured to flange 12. The front portion of bottom wall 8 forwardly of flange 12 on housing 5 rests on bracket 4. Securing member 14 rests on the top of the front portion of bottom wall 8. Bracket 4, bottom wall 8 and securing member 14 are secured together as by rivets, only one of which is indicated by numeral 15, passing through holes in the respective elements as shown. Securing member 14 has upstanding side arms 16 and 17 which are secured to side walls 9 and 10 as by rivet 18 passing through holes in side walls 9 and 10, and in arms 16 and 17 as shown. Rear arms 19 and 20 on securing member 14 are secured to bulkhead 13 as by rivet 21 passing through holes in the respective elements as shown.

The space in the rear of housing 5 behind bulkhead 13 forms a closed chamber which receives tube 22. Tube 22 has its bottom connected with a hole in the rear portion of bottom wall 8 and also with a flexible conduit 23 which is connected to the discharge side of a suction fan in body portion 1. The top end of tube 22 is connected with an elbow conduit 24 formed intergrally with bulkhead 13 and projecting rearwardly thereof. The rear closed chamber portion of housing 5 has reinforcing members 25 and 26 formed integrally with top wall 7 and rear wall 11. Reinforcing members 25 and 26 define a socket for receiving the bottom end of handgrip 6 through hole 27 in top wall 7. Handgrip portion 6 has holes as at 28 therethrough and screw 29 extends through back wall 11, through holes as at 28 in handgrip 6 and into boss 30 formed integrally with bulkhead 13.

The top portion of bulkhead 13 forms part of an air-water separator and includes a boundary wall 31 on one side of the opening for elbow 24. Thus, the opening for elbow 24 is bounded at its top by a portion of top wall 7 and at its sides by a portion of side wall 10 and boundary wall 31. Cover member 32 is secured to the outer edges of boundary wall 31 and the surrounding portions of top wall 7 and side wall 10 by adhesive. Boundary wall 31 along with cover member 32 and the surrounding portions of top wall 7 and side wall 10 define a reversal conduit to effect a complete reversal in the direction of air flow through tube 22. Air flowing upwardly through tube 22 and elbow 24 completely reverses direction to flow downwardly and exit at the bottom of cover member 32.

Figure 4:
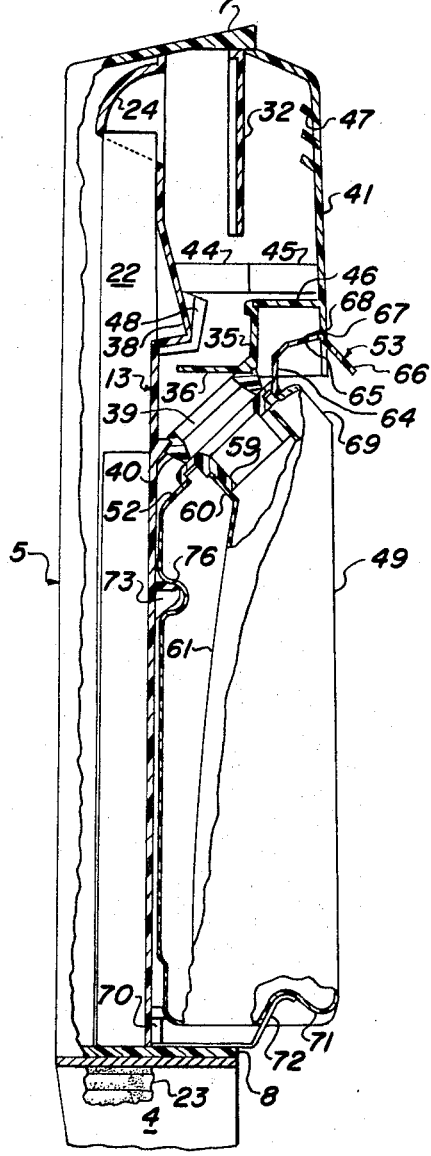
FIGURE 4 is a sectional view taken on line 4—4 of FIGURE 3.
Figure 3:
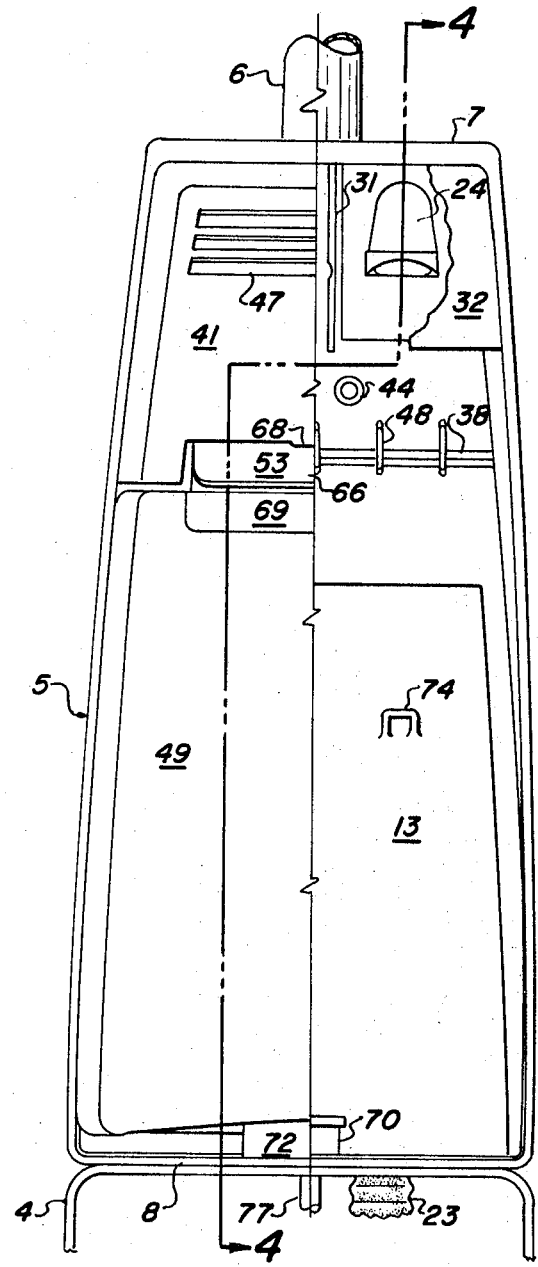
FIGURE 3 is a front view of the housing assembly with parts cut away for clarity.

A partition element 33 extends completely across housing 5 from side wall 9 to side wall 10. Partition element 33 includes a downwardly inclined flange 34, an upwardly extending substantially vertical flange 35 and an intermediate flange 36. The side edges of flanges 34, 35 and 36 are adhesively secured to side walls 9 and 10, and the forward edge of flange 34 is adhesively secured to bulkhead 13 at flat portion 37. Thus, bulkhead 13 divides housing 5 into a rear closed chamber portion and a front recessed portion, and partition element 33 divides the front recessed portion into an upper air-water separator portion and a lower recessed container mounting portion. Bulkhead 13 is formed integrally with an outwardly extending offset portion 38 spaced slightly above intermediate flange 36 on partition element 33. In assembled position, as shown in FIGURE 4, offset portion 38 extends outwardly from bulkhead 13 beyond the rearward edge of intermediate flange 36.

A bottom liquid outlet opening 39 is formed in flange 34 of partition element 33 below intermediate flange 36 and hole 39 is bounded by a rubber gasket 40. The air-water separator is reached from hole 39 through the space between the forward edge of intermediate flange 36 and bulkhead 13. As seen in FIGURE 4, this space is rearwardly of offset 38 so that the liquid outlet passage from the air-water separator is rearwardly of offset 38.

A closure member 41 is secured to the upper portion of housing 5 as by a screw 42 extending through bored boss 43 in reinforcing member 26 of FIGURE 2, through bored boss 44 in bulkhead 13 and threaded into boss 45 formed integrally with closure member 41. The edges of the top and side walls on closure member 41 seal against the edges of top wall 7 and side walls 9 and 10. A bottom flange 46 extends completely thereacross and seals against upwardly extending flange 35 on partition element 33 as shown in FIGURE 4. Closure member 41 includes air outlet openings 47 in the upper portion thereof. Offset portion 38 on bulkhead 13 has deflectors as at 48 against which the air-water mixture strikes when emerging from beneath cover member 32 and helps to separate the moisture from the air. When the appliance is in use the handle portion is inclined rearwardly and liquid separated from the air stream collects on deflectors 48 and offset portion 38, and other surfaces in the air-water separator, and drains through the space between the forward edge of intermediate flange 36 and bulkhead 13, and then through opening 39 in downwardly projecting flange 34 in partition element 33.

Figure 6:
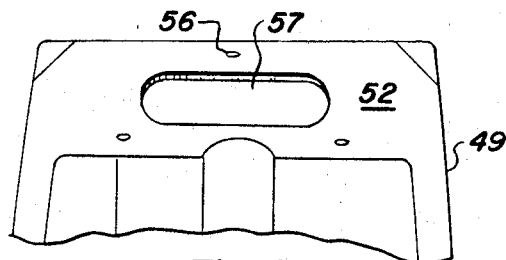
FIGURE 6 is a view taken in the same direction as FIGURE 5 and showing only a top portion of the container of FIGURE 5 with parts removed from FIGURE 5 for clarity.
Figure 5:
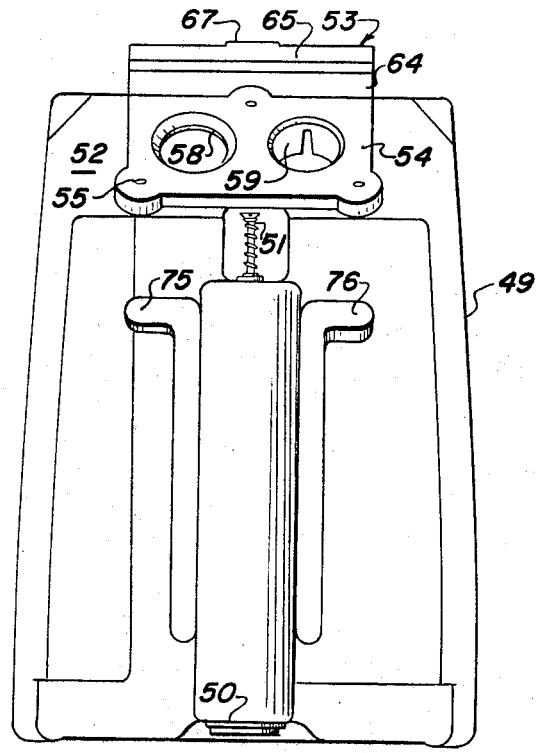
FIGURE 5 is a rear view of a liquid container used with the housing assembly of the present invention.

Referring to FIGURE 5, there is shown a liquid container 49 having a valved outlet 50 at the bottom rear thereof operated by an actuating rod 51. Container 49 has an upper portion sloping upwardly from back toward the front to define a flat sloping surface 52. Secured to sloping surface 52 is a latch member 53 which has a flat attaching portion 54 through which screws extend as at 55 in FIGURE 5 into holes as at 56 in sloping surface 52. Sloping surface 52 has a single elongated opening 57 therein and the periphery of attaching portion 54 on latch member 53 seals against the periphery of opening 57. Attaching portion 54 has a clean liquid opening 58 therein providing access to the interior of container 49. Another opening in attaching portion 54 has a neck 59 depending therefrom over which a neck 60 on a collapsible flexible container 61 fits tightly and is adhesively secured. A slot 62 through neck 59 is not completely closed all the way up by neck 60 so that a small opening at the top of slot 62 provides communication between the interior of flexible container 61 and container 49. A cap member 63 in FIGURE 2 is provided to close and seal clean liquid opening 58 in FIGURE 5.

Integral with latch member 53 and projecting upwardly from the front edge thereof is a leg 64. A connecting leg 65 projects outwardly and slightly upwardly from the top of leg 64. Connecting leg 65 may be said to be substantially horizontal. An outer leg 66 depends from leg 65 as shown in FIGURE 4. Formed substantially at the intersection of legs 65 and 66 is a projection 67. Closure member 41 includes a bottom catch portion 68 depending below flange 46 and projection 67 latches beneath and behind catch portion 68. Latch member 53 is made of substantially rigid but bendable acrylo-nitrile butadiene styrene or polyvinyl acetate, or any other suitable synthetic plastic material as very well known to those skilled in the art. When a horizontal or downward force is applied to leg 66 it causes connecting leg 65 to bend downwardly thereby moving projection 67 to a lower position than its normal rest position so that projection 67 can be engaged and disengaged from catch 68. One side of projection 67 is sloped or cammed as seen in FIGURES 2 and 4 so that it is unnecessary to deform leg 65 when latching. Simply applying a force to container 49 causes the cam surface on projection 67 to bear against the bottom of catch 68 to deform leg 65 and allow projection 67 to snap behind catch 68. Taken together legs 64, 65 and 66 on latch member 53 define a handle substantially in the shape of an inverted U. The top forward portion of container 49 is sloped upwardly at 69 to provide clearance beneath leg 66 for a person's fingers. This could be omitted by making leg 64 longer but the preferred disclosed embodiment saves considerable space and is superior. Thus, legs 64, 65 and 66 together define a carrying handle for container 49 and also for the entire appliance when container 49 is in position on the recessed front of housing 5.

Valve 50 on container 49 rests on valve seat 70 on securing member 14 as seen in FIGURE 2. Container 49 has a recess 71 in the bottom forward portion thereof to receive retainer 72 on securing member 14 to keep the bottom portion of container 49 from falling outwardly. Container 49 is blow molded of polyethylene or other suitable material as well known to those skilled in the art. Such materials bow outward slightly when the container is filled with liquid and this decreases the height of the container. Also, in the present device when the container 49 is in position as shown in FIGURE 4 and the device is dropped or vertically jarred the weight of liquid in container 49 bows the walls out and tends to collapse the container vertically. This tends to unlatch projection 67 from catch 68. To prevent this, bulkhead 13 has outwardly extending projections 73 and 74 which are received in recesses 75 and 76 in the back of container 49. The top walls of the recesses 75 and 76 rest on projections 73 and 74 to prevent vertical collapse of container 49. Thus, even though the front and side walls of container 49 bow outwardly the support provided by projections 73 and 74 is sufficient to prevent enough vertical collapse to release the latch. When container 49 is in position as shown in FIGURE 4 gasket 40 around outlet 39 from the air-water separator seals against the outer periphery of opening 59 in attaching portion 54 leading to collapsible container 61, and valve 50 seals against valve seat 70. Projections 73 and 74 also help to maintain an effective seal between gasket 40 and opening 59. The recesses 75 and 76 should definitely be in the upper half of container 49 and preferably well above the midpoint. The resiliency in legs 64, 65 and 66 once projection 67 is latched beneath catch 68 biases the container 49 inwardly and downwardly to effectively seal the valve 50 against seat 70, and gasket 40 against opening 59. Lower flange 34 on partition element 33 slopes at substantially the same angle as sloping portion 52 on container 49 so that an effective seal can be established. The slope angle is preferably around forty-five degrees although it could vary between substantially 40 to 50 degrees.

Container 49 is adapted to be filled with clean liquid through opening 58 and that liquid is dispensed through valve 50 and hose 77 connected to valve seat 70 through holes 78 and 79 in bracket 4 and bottom wall 8 of housing 5. Dirty liquid feeds from the air-water separator into collapsible container 61 which expands to have larger capacity as clean liquid is dispensed. With the communicating opening provided by slot 62 the interiors of containers 49 and 61 are always at the same pressure which will be atmospheric if the fan is not running or above atmospheric if the fan is running. When container 61 has a considerable amount of liquid therein and the handle is tilted far back there is a tendency for the liquid to run out of container 61 through separator outlet 39 and up the space between flange 36 and bulkhead 13. However, liquid blocking the space between flange 36 and bulkhead 13 leaves both containers 49 and 61 sealed so that a partial vacuum is created therein by the loss of liquid from container 61. The atmospheric or above atmospheric pressure on liquid in the space between flange 36 and bulkhead 13 then prevents further liquid from flowing out of container 61 because the interior of containers 61 and 49 is below atmospheric pressure. This provides an advantageous antiflood feature to prevent dirty liquid from flowing back down tube 22 or out vent openings 47 if the handle is tilted back too far.

Those skilled in the art will readily appreciate the advantages of the housing assembly of the present invention. While only one embodiment of the present invention has been shown and described it is to be understood that it is only illustrative and is not to be taken in a limiting sense. The present invention includes all equivalent variations of the embodiment disclosed and is limited only by the scope of the claims.

Other details of a device with which the present invention is used are disclosed in copending applications of Robert F. Dyer, Ser. No. 594,624, filed Nov. 15, 1966; Brandt F. Ziegler, Ser. No. 594,623, filed Nov. 15, 1966; and Donald H. Bowers, Ser. No. 594,580, filed Nov. 15, 1966.

I claim:
1. In a unitary floor scrubbing and drying appliance,
 (a) a main body portion having a front and rear,
 (b) handle means attached to said body portion,
 (c) elongated housing means secured to said handle means,
 (d) said housing having a rear wall, top and bottom walls, side walls and an open front defining a dished cavity in said housing,
 (e) said open front facing to said front of said body portion and said side walls of said housing extending substantially longitudinally of said handle,
 (f) air-water separator means in the top portion of said housing cavity,
 (g) a substantially flat bulkehad extending substantially parallel to said rear wall of said housing and being secured to said bottom and side walls in a position spaced rearwardly inside said cavity from the edges of said bottom and side walls, said bulkhead extending from said bottom wall at least to said air-water separator and defining a compartment in said housing behind said bulkhead and a container receiving recess forwardly of said bulkhead,
 (h) suction creating means on said appliance,
 (i) a water pickup suction nozzle on said body portion,
 (j) conduit means connecting said nozzle to said suction creating means and to said air-water separator,
 (k) said conduit extending from said body portion and through said compartment to said air-water separator.

2. The appliance of claim 1 wherein said bulkhead extends the full length of said housing and is secured to said top wall, the top portion of said bulkhead forming part of said air-water separator.

3. The appliance of claim 2 wherein a substantially horizontal partition element extends across said housing from one side wall to the other forwardly of said bulkhead to divide said container receiving recess from said air-water separator, the top portion of said bulkhead forming part of said air-water separator being offset outwardly toward the open front of said housing at a position spaced a small distance above said partition element, and a hole through said partition element connecting the top of said container receiving recess with the bottom of said air-water separator, said hole entering said air-water separator at a point spaced rearwardly of the forwardmost projection of said offset portion.

4. The appliance of claim 2 wherein said top portion of said bulkhead has an opening in the upper portion thereof forming an entry into said air-water separator, said conduit being connected with said opening.

5. The appliance of claim 4 wherein said opening is bounded at its top by a portion of said top wall of said housing and at one side by a portion of one of side walls of said housing, a substantially vertical boundary wall formed integrally with said top portion of said bulkhead and projecting outwardly therefrom on the other side of said opening, said boundary wall extending from said top wall to the bottom portion of said air-water separator, and a cover member secured to said top, side and boundary walls surrounding said opening, said cover member being spaced outwardly from said top portion of said bulkhead.

6. The appliance of claim 3 wherein said air-water separator includes a front closure member, said closure having flanges sealingly engaged against outer edges of said top wall, upper portions of said side walls and said partition element, said closure member having air exhaust openings in the top portion thereof.

7. The appliance of claim 1 wherein said handle comprises said housing, a bracket member and an elongated grip member, said bracket member being attached to said main body portion, said bottom wall of said housing being attached to said bracket member, and said grip member being attached to the top portion of said housing.

References Cited

UNITED STATES PATENTS 3,101,505  8/1963  Belicka et al. _____ 15—320
3,218,783  11/1965  Ripple _____ 15—350 X ROBERT W. MICHELL, *Primary Examiner.*

U.S. Cl. X.R.

16—62